United States Patent [19]

Fornadel et al.

[11] Patent Number: 4,562,218

[45] Date of Patent: Dec. 31, 1985

[54] FORMABLE PULP COMPOSITIONS

[75] Inventors: J. Stephen Fornadel, Millersville; Harry F. Long, East Hempfield Township, Lancaster County, both of Pa.

[73] Assignee: Armstrong World Industries, Inc., Lancaster, Pa.

[21] Appl. No.: 532,351

[22] Filed: Sep. 16, 1983

Related U.S. Application Data

[63] Continuation-in-part of Ser. No. 429,243, Sep. 30, 1982, abandoned.

[51] Int. Cl.$^4$ .................... B32B 23/04; B32B 23/06; B32B 23/08; D21F 1/82
[52] U.S. Cl. ........................ 524/15; 524/27; 524/33; 524/34; 524/47; 524/2; 524/907; 524/492; 428/529; 162/142; 162/148; 162/156; 162/164.1; 162/166; 162/168.1; 162/170
[58] Field of Search ............ 524/13, 15, 27, 33, 524/34, 47, 2, 492, 907, 78; 428/526, 529, 308.4, 308.8; 106/163 R, 89, 92, 93; 162/142, 148, 156, 164.1, 166, 168.1, 170

[56] References Cited

U.S. PATENT DOCUMENTS

| | | | |
|---|---|---|---|
| 3,825,471 | 7/1974 | Fraiman | 162/147 |
| 3,895,997 | 7/1975 | Haywood | 162/164.1 |
| 3,907,728 | 9/1975 | Lambuth et al. | 524/34 |
| 4,111,730 | 9/1978 | Balatinecz | 428/529 |

OTHER PUBLICATIONS

Betts, *Exploring Papier Mache*, Davis Press, Worcester, Mass. 1955, pp. 15–19.

*Primary Examiner*—John Kight
*Assistant Examiner*—Nathan M. Nutter
*Attorney, Agent, or Firm*—Laird F. Miller

[57] ABSTRACT

The present invention concerns our discovery that aqueous cellulosic slurries comprising primary binder, newsprint, sulfite pulp, and vegetable shell flour can be prepared and formed as desired into various configurations. The materials thus formed are usable for a variety of purposes including furniture, paneling and flooring structures.

54 Claims, No Drawings

FORMABLE PULP COMPOSITIONS

The present application is a continuation-in-part of copending application Ser. No. 429,243, filed Sept. 30, 1982, now abandoned.

The present invention relates to pulp compositions and more particularly to pulp compositions which may be formed into desired configurations.

BACKGROUND OF THE INVENTION

The preparation of molded cellulosic materials has long been known in the art and substantial effort has been expended to develop moldable compositions which provide objects having good appearance and durability. The present invention concerns novel compositions and processes which provide wood-like products.

THE PRIOR ART

A number of references describe aqueous compositions which may be molded into a desired configuration. For example, U.S. Pat. No. 3,825,471 discloses cardboard compositions prepared from kenaf fibers, cotton rags, gin waste and binder in an aqueous medium; U.S. Pat. No. 3,988,270 describes extrudable aqueous compositions comprising up to 3% water, from 1 to 30% of a vegetable shell flour and a thermoplastic resin; U.S. Pat. No. 4,012,561 discloses a process for forming decorative laminates comprising a substantial amount of waste newspaper whereby the newspaper is pulped and formed into sheets by conventional fourdrinier technology and then laminated together in multiple layer sheets; and U.S. Pat. No. 4,248,743 discloses a composite comprising wood pulp and a polymeric matrix, sufficient polymeric material being present to provide a continuous polymeric matrix phase. Nevertheless, the compositions prepared according to these references have not proved to be entirely satisfactory for forming moldable products.

Accordingly, one objective of the present invention is to provide unique aqueous-based moldable compositions which may be formed in a variety of configurations varying from flat sheets to distinctive shapes such as furniture.

Another objective of the present invention is to provide a process for utilizing these materials to provide materials having a desired configuration.

Yet another objective of the present invention is to provide molded products comprising sufficient cellulosic materials to be accepted by consumers as "wood" products.

These and other advantages of the present invention will become apparent from the detailed description of the preferred embodiments which follow.

SUMMARY OF THE INVENTION

The present invention concerns our discovery that aqueous cellulosic slurries comprising primary binder, newsprint, sulfite pulp, and vegetable shell flour can be prepared and formed as desired into various configurations. The materials thus formed are usable for a variety of purposes including furniture, paneling and flooring structures.

DETAILED DESCRIPTION OF PREFERRED EMBODIMENTS

In one embodiment, the present invention comprises a cellulosic composition which is useful to prepare articles having desired configurations, said composition comprising by weight 100 parts of primary binder, from about 25 to about 700 parts of newsprint, from about 25 to about 500 parts of sulfite pulp, from about 25 to about 500 parts of vegetable shell flour and a suitable quantity of water.

In a second embodiment, the present invention comprises a cellulosic product having a desired configuration, said product comprising by weight 100 parts of primary binder, from about 25 to about 700 parts of newsprint, from about 25 to about 500 parts of sulfite pulp and from about 25 to about 500 parts of vegetable shell flour.

In a third embodiment, the present invention comprises a process for preparing cellulosic articles having a desired configuration, said process comprising the steps of preparing an aqueous slurry comprising by weight from about 25 to about 700 parts of newsprint, from about 25 to about 500 parts of sulfite pulp, from about 25 to about 500 parts of vegetable shell flour, and optional components; adjusting the pH as necessary to cause precipitation of a subsequently added primary binder onto the solid components of said slurry; dispersing 100 parts of said primary binder in said slurry; disposing said slurry in a desired configuration; removing excess water from said slurry to form a pre-shaped article having the desired configuration; and drying said preshaped article.

In a fourth embodiment, the present invention comprises a process for preparing cellulosic articles having a desired configuration, said process comprising the steps of preparing a master batch slurry comprising from about 25 to about 700 parts of newsprint, from about 25 to about 500 parts of sulfite pulp and from about 25 to about 500 parts of vegetable shell flour; forming said master batch slurry into a mat; intermixing said mat with optional components and 100 parts of primary binder; and forming the intermixed material into a desired configuration.

The molded cellulosic products presently known in the art typically comprise a maximum of about 40–45% cellulosic materials. Although compositions containing higher levels of cellulose are known, these compositions have often proved to be unsatisfactory. For example, in U.S. Pat. No. 4,248,743, which was referred to above, it is noted that Composition No. 4 (which comprises about 56% by weight of fiber) is crumbly and shows weak cleavage planes.

Surprisingly, we have discovered that moldable compositions may be prepared according to the present invention and used to produce products which contain substantially higher quantities of cellulosic materials, perhaps on the order of 90% or more. These products are useful for a variety of purposes, such as floor and wall coverings, decorative objects and furniture. Further, because of the high cellulose content, they are acceptable as wood products.

Another advantage of the present invention is that products can be formed which have substantially higher densities than products which are presently formed according to the prior art. Thus, whereas the present invention can conveniently be used to prepare molded products having a density of as high as 55 or more pounds per cubic foot (pcf), the prior art processes based on beater saturation technology and the like have conventionally been used to produce products having much lower densities.

The compositions of the present invention are based on 100 parts of primary binder. Examples of primary binders which will give suitable results are thermoset or thermoplastic binders such as urea-formaldehyde binders, melamine binders and latex binders, such as polyvinyl chloride binders, polyacrylate binders, polystyrene-butadiene (SBR) binders, chlorinated SBR binder, and carboxylated SBR binders. It is understood, however, that the aforementioned listing of primary binders is provided by way of illustration and is not intended to limit the scope of the present invention.

The purpose of the primary binders is to impart wood-like properties to the resulting product. Thus, the primary binders must be capable of providing acceptable tensile strengths, transverse strength, nail-pull strength, and the like, such that the product is comparable to wood. In a preferred embodiment, the binder will be a self-crosslinking acrylic latex binder such as Rhoplex TR407 or Hycar 2671.

In combination with the primary binder are included newsprint, sulfite pulp and vegetable shell flour, all of which comprise the cellulosic ingredients of the composition. While newsprint and sulfite pulp are well known components for beater saturation technology, the combination of all three components is unique. Although applicant does not desire to be bound by any theory of operability, it appears that the vegetable shell flour possesses the ability to fill the interstitial voids between the fibrous particles of pulp and newsprint, thus leading to a highly preferred packing phenomenon. Thus, when the composition is molded and compressed, products having high densities and very smooth surfaces are obtained.

From about 25 to about 700 parts by weight of newsprint may be used to practice the present invention; however, from about 50 to about 400 parts of newsprint is preferred and from about 90 to about 310 parts of newsprint is especially preferred. The sulfite pulp may be present in from about 25 to about 500 parts by weight; however, from about 50 to about 350 parts of sulfite pulp is preferred and from about 90 to about 310 parts is most preferred.

The vegetable shell flour may be derived from nut shells, such as pecan, walnut, or peanut shells, and also from other sources such as coffee bean shells and rice husks. From about 25 to about 500 parts by weight of vegetable shell flour may be used; however, from about 50 to about 350 parts of vegetable shell flour is preferred, and from about 90 to about 310 parts is most preferred.

In one preferred embodiment, the aforementioned ingredients are formulated using standard beater saturation technology into an aqueous slurry which preferably comprises from about 2 to about 8% solids by weight. It must be kept in mind, however, that more or less water may be utilized depending on the desires of the artisan.

In addition to the aforementioned primary binder and cellulosic ingredients, other materials may also be present in the slurry. For example, secondary binders may be used to promote better adhesion between the primary binder and the cellulosic materials, provide better wet strength so that a wet blanket of felted solids will hold together more readily during processing, provide improved impact resistance in the final product, and the like. Secondary binders are added for reasons other than to provide wood-like properties to the product because that is the function of the primary binder. Examples of secondary binders are starch powder, polyvinyl alcohol, fondue cement, portland cement, medusa cement and the like. Fondue cement is especially preferred because it has an affinity for water and tends not to be lost through the wires of the fourdrinier apparatus during felting. The quantities of these materials may vary depending on their nature. For example, from about 10 to about 350 parts by weight of starch powder may be used in relation to 100 parts of primary binder, although from about 20 to about 100 parts is preferred. Similarly, from about 30 to about 100 parts of cement may be used, although from about 50 to about 90 parts is preferred. In the usual situation, wet end additives such as alum and ammonium hydroxide will be required to adjust the pH in order to precipitate the binder. Optionally, the composition may also contain additional additivies such as wet-strength resins and glass fibers or other reinforcing fibers. Preferably, the reinforcing fibers will be unaffected by the temperature used during the molding operation.

The cellulosic components of the present invention will typically comprise by weight from about 43 to about 94% of the final product. Preferably, however, they will comprise from about 60 to about 92% of the final product and, most preferably, from about 73% to about 90%.

As a first step in preparing the slurry described above, a slurry of the cellulosic ingredients is prepared. For example, using standard beater technology such as with an air impeller beater, a master batch slurry is prepared from shredded newsprint, a dispersable form of pulp and the vegetable shell flour. The master batch may be used to advantage in a variety of ways. For example, it may be felted onto fourdrinier wires by means well known in the art. The felted material may be retained in a wet state for later use or it may be dried using a drum or other appropriate means and similarly retained. Alternatively, it may be further mixed with the secondary binders, reinforcing materials, fillers, and the like and cast or molded into a final product. If the dried master batch is used, it can be pulverized, blended while in the dry state with other necessary ingredients and then compressed into a final configuration, or it can be repulped into a slurry, blended with other components, and then placed in a desired configuration.

The preferred method of forming final products from a slurry will usually involve the addition of the secondary additives such as fondue cement, starch, reinforcing materials, wet strength resins and the like to the slurry, after which the pH of the slurry is adjusted with alum and a base such as ammonium hydroxide, or by other means well-known in the art. The primary binder is then added and it precipitates onto the solid particles, giving a slurry which may be placed in a desired configuration.

The components and characteristics of a slurry can be varied substantially depending on the desires of the artisan. Further, the utilities of the resulting slurries will usually be quite diverse because products varying from furniture to wall and floor coverings can be prepared wherein the cellulosic content is adjusted from relatively high (e.g. 90%) to relatively low (e.g. 45%) levels. Certain preferences will become apparent, however. For example, if the materials are intended for use as functional items such as furniture, a higher primary binder level of perhaps 35–40% will often be preferred in combination with a cellulosic content of perhaps as low as 45%. On the other hand, if a sheet material such as a wall or floor covering is intended, a higher cellulose content on the order of perhaps 85% may be desired, in combination with a correspondingly lower binder content.

If the desired configuration is a sheet product, the sheet may be prepared as described above, laminated together in layers, and pressed or embossed to give composite structures which are usable as wood-type sheet materials for flooring or tile products. Alternatively, the sheets can be pulverized to yield ground stock which can be used as disclosed herein.

Decoratively molded objects such as furniture may be prepared either directly from a slurry or from ground stock. When a slurry is used, a casting having the desired configuration may be prepared using metal or, preferably, silicone rubber, molding materials. The casting may be equipped with a vacuum apparatus to assist in the removal of excess water, or it may be a conventional non-vacuum casting. In either event the binder-coated slurry is pumped into the casting and preferably pre-shaped by covering the casting with gauze and roughly shaping the solid using a contoured backing plate. The gauze permits excess water to escape and also permits the backing plate to be separated without damaging the wet pulp. When preshaping is complete, the backing plate is separated, the gauze is removed and the backing plate is reinserted. Then, as a last step, the molded material is dried under heat and pressure, cooled, and removed from the press to give a high-density product.

When ground stock is used, a sheet material comprising all of the desired ingredients is prepared and dried. The sheet is then pulverized into stock which preferably has a uniform particle size. It has been found that this may be conveniently accomplished by chilling the sheet prior to pulverizing it. If the sheet is pulverized without chilling, however, lumps and non-uniform particles are often obtained. The use of substantially non-uniform particles will often lead to undesirable appearance and strength characteristics and should be avoided. The pulverized stock is next placed in a mold where it is heated under pressure, essentially as described above, to provide a high-density product.

Either of the above methods can be used to prepare products having a wide range of densities, such as from about one to about 55 pcf. However, they are especially useful to prepare products having densities of from about 20 to about 55 pcf and, in particular, from about 30 to about 55 pcf, depending on the desires of the artisan.

The advantages and attributes of the present invention may be more clearly understood by reference to the following examples which are intended to illustrate, but not to limit, the scope of the present invention.

EXAMPLE 1

This example will illustrate the preparation of a Master Batch. A mixture comprising 2% solids by weight was pulped in a hydropulper for 10 minutes. The mixture comprised water, 16.6 pounds of sulfite pulp, 16.6 pounds of newsprint and 16.6 pounds of pecan shell flour. After refining in a Jordan refiner, the stock was diluted to a consistency of 1% solids and felted onto fourdrinier wires at a wet gauge of 3/32 inch. The resulting material, which had good wet strength, was rolled up and stored in a closed container for later use.

EXAMPLE 2

A slurry was prepared with an air impeller beater from 7 liters of water and 99.9 grams (dry weight) of Master Batch (Example 1). To the slurry was then added 2.5 grams (dry basis) of wet strength resin (Kymene 2064 from Hercules as a 3.5% aqueous solution) and 6.7 grams of starch powder. Twelve grams of alum and sufficient ammonium hydroxide solution to bring the pH to 7 were added, after which 25 grams of a self-crosslinking acrylic latex primary binder (Hycar 2671 from B. F. Goodrich) was added. The binder immediately precipitated onto the particulate materials. The particulate matter was felted onto fourdrinier-type wires to give a product having a thickness of approximately 1/16 inch. This product could be held, handled and transported in a wet state without losing its integrity. When dried on a drum at approximately 300° F., the dried product similarly maintained its integrity and could be held, handled, and transported. This material was amenable to (1) pulverization and recasting and (2) lamination, as hereinafter described.

EXAMPLE 3

A quantity of Master Batch was drum-dried at 300° F. and retained for later use. Subsequently, the sheet material, which had a thickness of 3/32 inch, was pulverized using a Fitzmill, and two formulations were prepared as follows:

| Ingredient | Example 3A | Example 3B |
|---|---|---|
| Water | 14 Liters | 14 Liters |
| Master batch (dry weight) | 900 g | 900 g |
| Pecan shell flour | 36.2 g | — |
| Fondue cement | — | 72.4 g |
| Starch powder | 30 g | 30 g |
| Glass fibers | 9.6 g | 9.6 g |
| Polyvinyl alcohol (Elvanol BT from duPont) | 10 g | 10 g |
| Wet strength resin (Kymene 2064 from Hercules; 3.5% aqueous solution) | 251 ml | 251 ml |
| Alum | 36 g | 36 g |
| Ammonium hydroxide | * | * |
| Acrylic latex binder (dry basis) (Rhoplex TR407 from Rohm & Haas) | 165 g | 165 g |

*Volume not measured; sufficient quantity added to adjust pH to 7

In preparing these formulations, the master batch and the excess pecan shell flour (as required) were slurried in water and the remaining ingredients were added in order, as applicable. The mixture was made neutral with ammonium hydroxide and, as a last step, the primary binder was added, immediately precipitating onto the particulate materials.

Each slurry was pumped into appropriate molds. As one example, an aluminum mold 9"×9"×½" was filled with slurry, covered with gauze, and a backing plate was inserted. Cold pressure was applied to squeeze out the excess water. The backing plate was then removed, the gauze was removed, and the backing plate was reinserted. The wet, molded material was finally dried at 350°–400° F. for 7–15 minutes to give dried 9-inch square tiles. The cellulose content of Example 3A was about 79% whereas that of Example 3B was about 73.5%.

These tiles were tested for Tensile Strength Perpendicular to Surface and were subjected to a Nail Withdrawal Test, both essentially as described in ASTM D 1037-78. They were also subjected to a Transverse Strength test essentially as described in ANSI/ASTM C 209-72. The results obtained were as follows:

|  | Test Result (average of three measurements) | |
|---|---|---|
| Test | Example 3A | Example 3B |
| Perp. Tensile Strength (lb./in² at failure) | 33.2 | 88.5 |
| Nail Withdrawal (lbs.) | 11.25 | 15.33 |
| at ave. thickness (in.) of | 0.434 | 0.438 |
| Transverse Strength | | |
| (load at failure, lbs.) | 48.9 | 90.7 |
| (modulus of rupture, psi) | 835 | 1509 |
| Apparent Density (pcf) | 32.52 | 43.09 |

EXAMPLE 4

Using the dry master batch described in Example 3, an aqueous slurry having a solids content of 2% was prepared comprising the following components:

| Ingredient | Quantity |
|---|---|
| Master batch (dry weight) | 1150 g |
| Fondue cement | 72.4 g |
| Starch powder | 30 g |
| Polyvinyl alcohol (Elvanol BT from duPont) | 10 g |

The slurry was refined using a Jordan refiner, the solids content was adjusted to 1.5%, and the following ingredients were added, in order:

| Ingredient | Quantity |
|---|---|
| Glass fibers | 14.4 g |
| Wet strength resin (Kymene 2064 from Hercules; 3.5% aqueous solution) | 251 ml |
| Alum | 36 g |
| Ammonium hydroxide | * |
| Acrylic latex binder (dry basis) (1:1 blend of Rhoplex TR407 from Rohm & Haas and Hycar 2671 from B. F. Goodrich) | 330 g |

*Volume not measured; sufficient quantity added to adjust pH to 7

The solids content was adjusted to 1% and the slurry was felted onto fourdrinier wires to give a wet mat of material. The mat was drum dried at 300° F. to give a layer of material 1/16 inch thick having a cellulose content of about 49%. This sheet was handled in a variety of ways, as follows:

EXAMPLE 4A

This example will illustrate the preparation of sheet product by pulverizing the sheets of Example 4 and forming the powder in a mold. A quantity of the 1/16-inch thick sheeting prepared according to Example 4 was cut into approximately 1 to 2-inch strips, covered with pulverized dry ice for 30 seconds and the sheet (including dry ice) was fed into a Fitzmill. The resulting particles were of substantially uniform size, were free of lumps and had a consistency comparable to freeze-dried coffee.

A quantity of this material (at room temperature after sublimation of the dry ice) was placed in a ½-inch mold and compressed at about 425° F. for 20 minutes under about 1,100 psi pressure.

The resulting board, which had a nominal thickness of ½ inch was tested for perpendicular tensile strength and perpendicular screw withdrawal essentially according to ASTM D 1037-78, giving the following results:

| Test | Particleboard Control | Fiberboard Control | Example 4A |
|---|---|---|---|
| Board thickness (inch) | 0.501 | 0.505 | 0.460 |
| Perp. tensile strength (lb./in² at failure) | 145.5 | 161.5 | 251.7 |
| Perp. screw failure) (lbs. at failure) | 235.8 | 328.8 | 276.3 |
| Apparent Density (pcf) | 50.76 | 46.32 | 69.12 |
| Modulus of Rupture (psi) | 3546 | 5394 | 2447 |

EXAMPLE 4B

This example will illustrate the lamination of a plurality of layers as obtained from Example 4 to provide a laminated vinyl structure. Seven layers of sheets prepared according to Example 4 were placed in a press at 425° F. for 20 minutes under 1,160 psi pressure. One face of the press was provided with a wood grain embossing plate which imparted a wood grain finish to the face of the material. The resulting product had a definite wood grain appearance as would be found with a decorative wall panel or as inside backing for a piece of furniture, the latter typically being provided in the prior art by hardboard.

EXAMPLE 5

This example will illustrate the dry forming of a molded product. The proportions of ingredients, excluding the wet end additives (water, Kymene, alum and ammonium hydroxide), are set forth in Example 3B.

The pulverized Master Batch was dry mixed with the cement, starch, glass fibers, polyvinyl alcohol and binder, and the mixture was placed in a mold. The mold was heated to about 400° F. for about 20 minutes under about 1100 psi pressure to produce a product which was somewhat less satisfactory than the products produced according to Examples 3 and 4.

This invention is not restricted solely to the descriptions and illustrations provided above, but encompasses all modifications envisaged by the following claims.

What is claimed is:

1. A cellulosic composition useful to prepare articles having a desired configuration, said composition comprising by weight 100 parts of thermoplastic or theromostet primary binder, from about 25 to about 700 parts of newsprint, from about 25 to about 500 parts of sulfite pulp, from about 25 to about 500 parts of vegetable shell flour, and a suitable quantity of water.

2. The invention as set forth in claim 1 hereof wherein said composition comprises from about 50 to about 400 parts of newsprint, from about 50 to about 350 parts of sulfite pulp, and from about 50 to about 350 parts of vegetable shell flour for every 100 parts of primary binder.

3. The invention as set forth in claim 2 hereof wherein said composition comprises from about 90 to about 310 parts each of the newsprint, the sulfite pulp and the vegetable shell flour.

4. The invention as set forth in claims 1, 2 or 3 hereof wherein said composition comprises at least one secondary binder.

5. The invention as set forth in claim 4 hereof wherein said secondary binder is selected from the group consisting of powdered starch, cement, and polyvinyl alcohol.

6. The invention as set forth in claim 5 hereof wherein said cement is selected from the group consisting of portland cement, fondue cement and medusa cement.

7. The invention as set forth in claims 1, 2 or 3 hereof wherein said composition comprises reinforcing fibers.

8. The invention as set forth in claim 7 hereof wherein said reinforcing fibers are glass fibers.

9. The invention as set forth in claims 1, 2 or 3 hereof wherein said primary binder is a melamine binder, a urea-formaldehyde binder or a latex binder.

10. The invention as set forth in claim 9 hereof wherein said primary binder is a latex binder selected from the group consisting of polyvinyl chloride binders, polyacrylate binders, SBR binders, chlorinated SBR binders and carboxylated SBR binders.

11. The invention as set forth in claim 10 hereof wherein said primary binder is a self cross-linking acrylic latex binder.

12. A cellulosic product having a desired configuration, said product comprising by weight 100 parts of primary binder, from about 25 to about 700 parts of newsprint, from about 25 to about 500 parts of sulfite pulp and from about 25 to about 500 parts of vegetable shell flour.

13. The invention as set forth in claim 12 hereof wherein said product comprises from about 50 to about 400 parts of newsprint, from about 50 to about 350 parts of sulfite pulp, and from about 50 to about 350 parts of vegetable shell flour for every 100 parts of primary binder.

14. The invention as set forth in claim 13 hereof wherein said product comprises from about 90 to about 310 parts each of the newsprint, the sulfite pulp and the vegetable shell flour.

15. The invention as set forth in claims 12, 13 or 14 hereof wherein said product comprises at least one secondary binder.

16. The invention as set forth in claim 15 hereof wherein said secondary binder is selected from the group consisting of powdered starch, cement, and polyvinyl alcohol.

17. The invention as set forth in claim 16 hereof wherein said cement is selected from the group consisting of portland cement, fondue cement and medusa cement.

18. The invention as set forth in claims 12, 13 or 14 hereof wherein said product comprises reinforcing fibers.

19. The invention as set forth in claim 18 hereof wherein said reinforcing fibers are glass fibers.

20. The invention as set forth in claims 12, 13 or 14 hereof wherein said primary binder is a melamine binder, a urea-formaldehyde binder or a latex binder.

21. The invention as set forth in claim 20 hereof wherein said primary binder is a latex binder selected from the group consisting of polyvinyl chloride binders, polyacrylate binders, SBR binders, chlorinated SBR binders and carboxylated SBR binders.

22. The invention as set forth in claim 21 hereof wherein said primary binder is a self cross-linking acrylic latex binder.

23. The invention as set forth in claims 12, 13 or 14 hereof wherein said product comprises not less than about 45% cellulosic material.

24. The invention as set forth in claim 23 hereof wherein said product comprises not less than about 60% cellulosic material.

25. The invention as set forth in claim 24 hereof wherein said product comprises from about 73 to about 90% cellulosic material.

26. The invention as set forth in claims 12, 13 or 14 hereof wherein the density of said product is not less than about 10 lbs. per cubic foot.

27. The invention as set forth in claim 26 hereof wherein said density is not less than about 20 lbs. per cubic foot.

28. The invention as set forth in claim 27 hereof wherein said density is not less than about 30 lbs. per cubic foot.

29. A process for preparing cellulosic articles having a desired configuration, said process comprising the steps of
preparing an aqueous slurry comprising by weight from about 25 to about 700 parts of newsprint, from about 25 to about 500 parts of sulfite pulp, from about 25 to about 500 parts of vegetable shell flour, and optional components;
adjusting the pH as necessary to cause precipitation of a subsequently added thermoplastic or thermoset primary binder onto the solid components of said slurry;
dispersing 100 parts of said primary binder in said slurry;
disposing said slurry in a desired configuration;
removing excess water to form a preshaped article; and
drying said preshaped article.

30. The invention as set forth in claim 29 hereof wherein said slurry comprises from about 50 to about 400 parts of newsprint, from about 50 to about 350 parts of sulfite pulp, and from about 50 to about 350 parts of vegetable shell flour for every 100 parts of primary binder.

31. The invention as set forth in claim 30 hereof wherein said slurry comprises from about 90 to about 310 parts each of the newsprint, the sulfite pulp and the vegetable shell flour.

32. The invention as set forth in claims 29, 30 or 31 hereof wherein said slurry comprises at least one secondary binder.

33. The invention as set forth in claim 32 hereof wherein said secondary binder is selected from the group consisting of powdered starch, cement and polyvinyl alcohol.

34. The invention as set forth in claim 33 hereof wherein said cement is selected from the group consisting of portland cement, fondue cement and medusa cement.

35. The invention as set forth in claims 29, 30 or 31 hereof wherein said slurry comprises reinforcing fibers.

36. The invention as set forth in claim 35 hereof wherein said reinforcing fibers are glass fibers.

37. The invention as set forth in claims 29, 30 or 31 hereof wherein said primary binder is a melamine binder, a urea-formaldehyde binder or a latex binder.

38. The invention as set forth in claim 37 hereof wherein said primary binder is a latex binder selected from the group consisting of polyvinyl chloride binders, polyacrylate binders, SBR binders, chlorinated SBR binders and carboxylated SBR binders.

39. The invention as set forth in claim 38 hereof wherein said primary binder is a self cross-linking acrylic latex binder.

40. The invention as set forth in claims 29, 30 or 31 hereof wherein said dried preshaped article comprises not less than about 45% cellulosic material.

41. The invention as set forth in claim 40 hereof wherein said dried preshaped article comprises not less than about 60% cellulosic material.

42. The invention as set forth in claim 41 hereof wherein said dried preshaped article comprises from about 73 to about 90% cellulosic material.

43. The invention as set forth in claims 29, 30 or 31 hereof wherein the density of said dried preshaped article is not less than about 10 lbs. per cubic foot.

44. The invention as set forth in claim 43 hereof wherein said density is not less than about 20 lbs. per cubic foot.

45. The invention as set forth in claim 44 hereof wherein said density is not less than about 30 lbs. per cubic foot.

46. The invention as set forth in claims 29, 30 or 31 hereof comprising the additional steps of
   pulverizing said preshaped article,
   placing the pulverized material in a casting having a desired configuration, and
   molding said pulverized material.

47. The invention as set forth in claim 46 hereof wherein said preshaped article is chilled before it is pulverized.

48. The invention as set forth in claim 46 hereof wherein said casting is provided with a wood grain embossing plate which imparts a wood grain appearance to said final product.

49. A process for preparing cellulosic articles having a desired configuration, said process comprising the steps of
   preparing a master batch slurry comprising from about 25 to about 700 parts of newsprint, from about 25 to about 500 parts of sulfite pulp and from about 25 to about 500 parts of vegetable shell flour;
   forming said master batch slurry into a mat;
   intermixing said mat with optional components and 100 parts of primary binder; and
   forming the intermixed material into a desired configuration.

50. The invention as set forth in claim 49 hereof wherein said slurry comprises from about 50 to about 400 parts of newsprint, from about 50 to about 350 parts of sulfite pulp and from about 50 to about 350 parts of vegetable shell flour for every 100 parts of primary binder.

51. The invention as set forth in claim 50 hereof wherein said slurry comprises from about 90 to about 310 parts each of the newsprint, the sulfite pulp and the vegetable shell flour.

52. The invention as set forth in claims 49, 50 or 51 hereof wherein said articles are prepared by drying and pulverizing said mat, and intermixing the pulverized material with said optional components and said binder.

53. The invention as set forth in claim 52 hereof wherein said intermixing is accomplished by preparing a slurry comprising said pulverized material and said optional components; adjusting the pH as necessary to cause precipitation of said primary binder onto the solid components of said slurry when said primary binder is subsequently added; dispersing said primary binder in said slurry; disposing said slurry in a desired configuration; removing excess water to form a preshaped article; and drying said preshaped article.

54. The invention as set forth in claim 52 hereof wherein said pulverized material, optional components and primary binder are intermixed in a dry state; placed in a casting having a desired configuration; and molded.

* * * * *